BEST AVAILABLE COPY

DEFENSIVE PUBLICATION T857,002

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 41

539,561

CONTAINER CLOSURE LINED WITH A THERMOPLASTIC RESIN

Donald C. Davis and Ben T. Pardue, both % Tennessee Eastman Company, P.O. Box 511, Kingsport, Tenn. 37662

Filed Apr. 1, 1966. Published Dec. 3, 1968
Class 117—21
1 Sheet Drawing. 8 Pages Specification

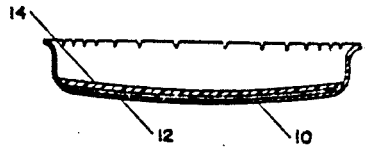

A container closure lined with an inner thermoplastic resin, preferably polyethylene, applied in powder form prior to melting and then cooled to solidify. Adhesion of the liner to the closure to form a good seal may be enhanced by an intervening layer of a powdered, wax-type adhesive, preferably a low molecular weight maleated polyethylene. The thermoplastic resin may contain a foaming agent such as sodium bicarbonate. The liner is applied by metering the resin in powder form into the container cap as it moves beneath an appropriate source of supply. The closures are then passed beneath a heating device which fuses the powder to a molten film which is cooled to cause solidification of the liner.

United States Patent Office

PTO - BOYERS, PA Duty Station

MISSING PAGE TEMPORARY NOTICE

PATENT # T 857002 FOR ISSUE DATE 12-3-1968

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Dwg 1 of 1

Data Conversion Operation

Boyers, Pa